United States Patent

[11] 3,597,070

| | | |
|---|---|---|
| [72] | Inventor | Magne Slettebo<br>Presteveien 23, Kirkenes, Norway |
| [21] | Appl. No. | 887,423 |
| [22] | Filed | Dec. 22, 1969 |
| [45] | Patented | Aug. 3, 1971 |
| [32] | Priority | Apr. 26, 1966 |
| [33] | | Norway |
| [31] | | 162,745 |
| | | Continuation-in-part of application Ser. No. 628,605, Apr. 5, 1967, now abandoned. |

[54] SYSTEM FOR INDEXING AND PROJECTING MICROFILM FOR SCANNING
6 Claims, 2 Drawing Figs.

[52] U.S. Cl............................................... 353/26,
352/119, 352/236
[51] Int. Cl................................................. G03b 23/12,
G03b 41/04
[50] Field of Search............................. 352/119,
236; 353/25, 26

[56] References Cited
UNITED STATES PATENTS

| | | | |
|---|---|---|---|
| 2,278,781 | 4/1942 | Harrison.................... | 352/119 |
| 2,761,351 | 9/1956 | Gehring.................... | 353/26 |

*Primary Examiner*—Leonard Forman
*Assistant Examiner*—Steven L. Stephan
*Attorney*—Pennie, Edmonds, Morton, Taylor and Adams ABSTRACT: The invention relates to a device for storing, retracing and the projecting of information on microfilm stored on and movable between two reels, the device being provided with optical "arresting" means making at least the index for the stored information appear in a stationary picture when the film moves continuously, the microfilm being divided longitudinally to provide cue index symbols on one side corresponding to the text identified by the symbols on the opposite side of the microfilm, and the device having a viewing screen provided with openings through which the index symbols may be seen.

3,597,070

SYSTEM FOR INDEXING AND PROJECTING MICROFILM FOR SCANNING

CROSS-REFERENCE TO RELATED APPLICATION

This application is a continuation-in-part of application Ser. No. 628,605, filed Apr. 5, 1967, now abandoned.

BACKGROUND OF THE INVENTION

1. Field of the Invention

This invention relates to a device for indexing and scanning microfilm, and particularly microfilm in reels, in which the film, with the help of expedient means, may be run from one reel to another and be stopped and read in a viewing window, in that the information on the film is projected onto a mat screen or the like.

2. Description of the Prior Art

Microfilm has been used for a number of purposes, and particularly for photographing and preserving documents in order to be able to store large quantities of information in a comparatively restricted space. Microfilm, when required, is read off in a reading apparatus in which the information on the film is projected onto a mat screen, and by drawing the film forwards or backwards the various documents come into view in turn and may be studied. In reading apparatuses known hitherto, it has however, taken a disproportionately long time to find the right document, and the fact that this operation is time-consuming, has resulted in microfilm not being used to any particular extent in a sector where it is particularly expedient.

On account of the ever increasing quantity of knowledge, encyclopedias, manuals and dictionaries are steadily increasing in scope, and it would be very convenient if the pages of such books could be photographed onto microfilm in such a manner that large reference works could be contained on just a few reels of narrow microfilm. The process of transferring the pages of the book onto film does not offer any problem, but on account of the difficulty of finding the information sought on the film, hitherto, as far as reference works are concerned, the benefit we have had from microfilm has been restricted to the fact that these works may be filed on microfilm and later reproduced from the film if required.

Projection apparatuses for microfilm known hitherto, do thus not have any equipment which makes it possible for a reader to find the required information on the film just as rapidly as he would be able to do by handling the large, heavy and inconvenient reference work.

The object of this invention is thus to improve projecting apparatuses for microfilm by furnishing a device for indexing and scanning film so that the reader, whilst the film continuously and rapidly runs through the apparatus, will be kept informed throughout where on the film (that is to say in the reference work) he is.

In known apparatuses for projecting and viewing microfilm, the film is drawn through evenly, either by hand or by motor, and as long as the film is in motion, the reader sees only a grey shadow on the mat screen, The film has to be stopped in order that the reader can find out where he is, and started again in one direction or the other dependent upon whether he has run the film too far or not far enough. These adjustments have to be carried out a number of times, and finally the reader arrives at the required information. Projection devices for substandard film, for example 8 mm. film, are however, available in the form of simple editing apparatuses in which a rotating mirror or prism is placed in the light path, and during the continuous movement of the film, rotates in such a manner that the picture which is projected onto the mat screen stands still in spite of the movement of the film until continued rotation of the mirror or prism makes the next frame stand still on the mat screen.

SUMMARY OF INVENTION

This invention is based on combining a projection and viewing apparatus for film, in which documents are stored, with an optical tilting arrangement in the light path, in the manner already known in the U.S. Pat. No. 2,381,997 to Bosley and U.S. Pat. No. 2,422,816 to Baia, at least for a part of the film where index symbols, letters, cue words, numerical indications etc. have been entered. The information which the reader is seeking may, for example, be stored on the one half of the film, and with the help of the optical tilting device in the manner already known from the above-mentioned patents, the index symbols are made to stand still for short moments, in spite of the uninterrupted movement of the film, and the reader is thus able to discern the information given by the cue word. When the reader has thus found the appropriate cue word, or other index symbols sought, the film is stopped, and the information required will be found on the mat screen. In this manner, it is no longer necessary to run the film backwards and forwards a number of times in order to narrow the search down to the frame which contains the information required.

This invention thus relates to a device for storing, locating and projecting information, catalogued with the help of symbols, comprising a film on which the information has been recorded, and an image projecting apparatus in which the film is placed and in which or from which the information can be projected onto a screen, the film having index symbols to facilitate the finding of the information in that the film is run forwards or backwards in the projecting apparatus, and the primary feature of the invention is that the film carries cue index symbols such as letters and words and the image projection apparatus has an optical tilting device, in the manner already known, which is operated by the film when this is moved, with the object, through refraction, to hold pictures of parts of the film stationary on the screen, whilst the film is in continuous motion, and that the index symbols on the film are projected and viewed thereby cooperating with the parts referred to above.

BRIEF DESCRIPTION OF THE DRAWING

In order to make the invention easier understood, it will be explained below in more detail with reference to the drawings in which.

DESCRIPTION OF THE PREFERRED EMBODIMENTS

Figure 1:
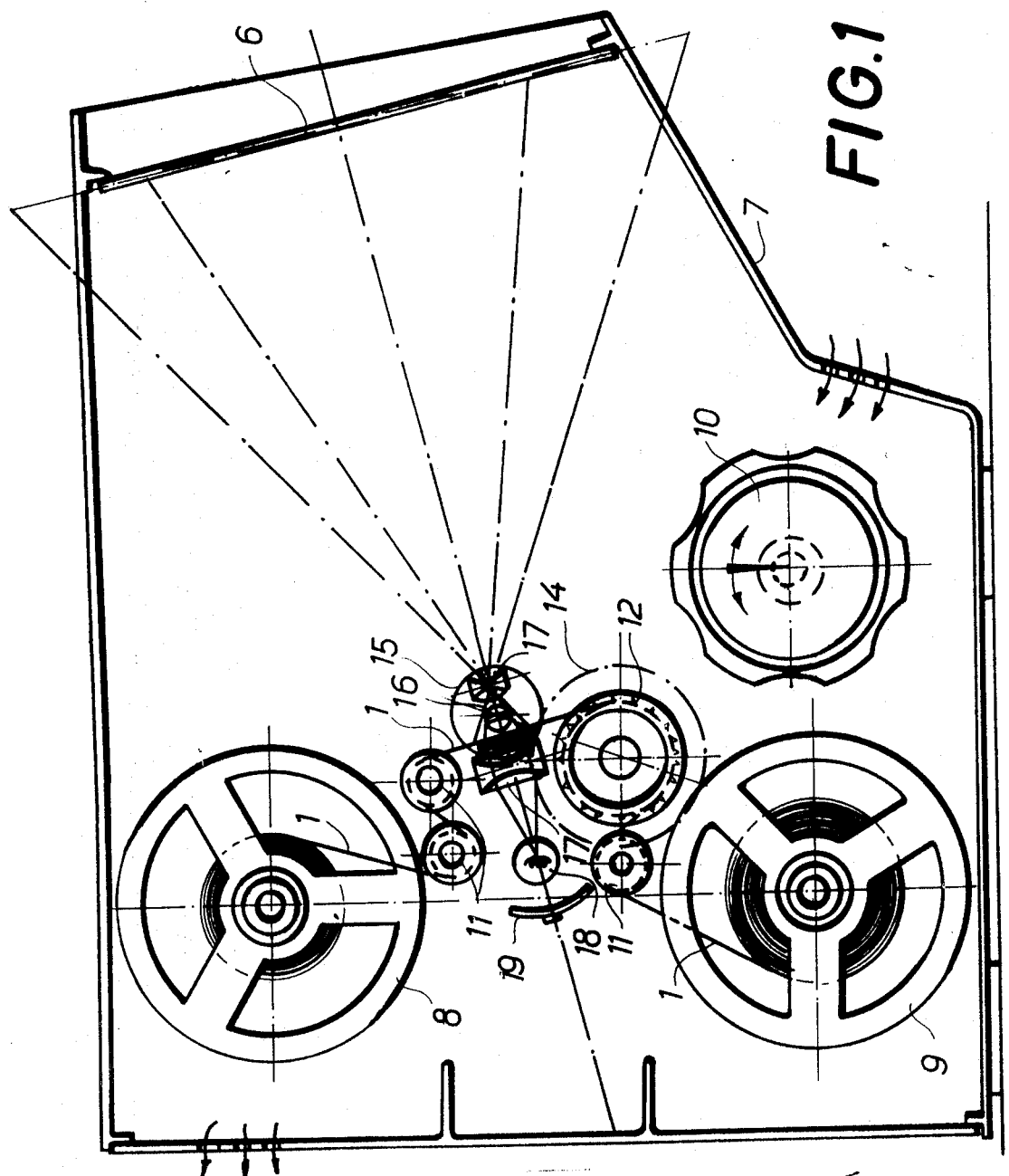
FIG. 1 is a diagrammatic side view of a projector or projection apparatus with the side of the housing removed to show the elements of the projector which are constructed and arranged in accordance with the invention.
Figure 2:
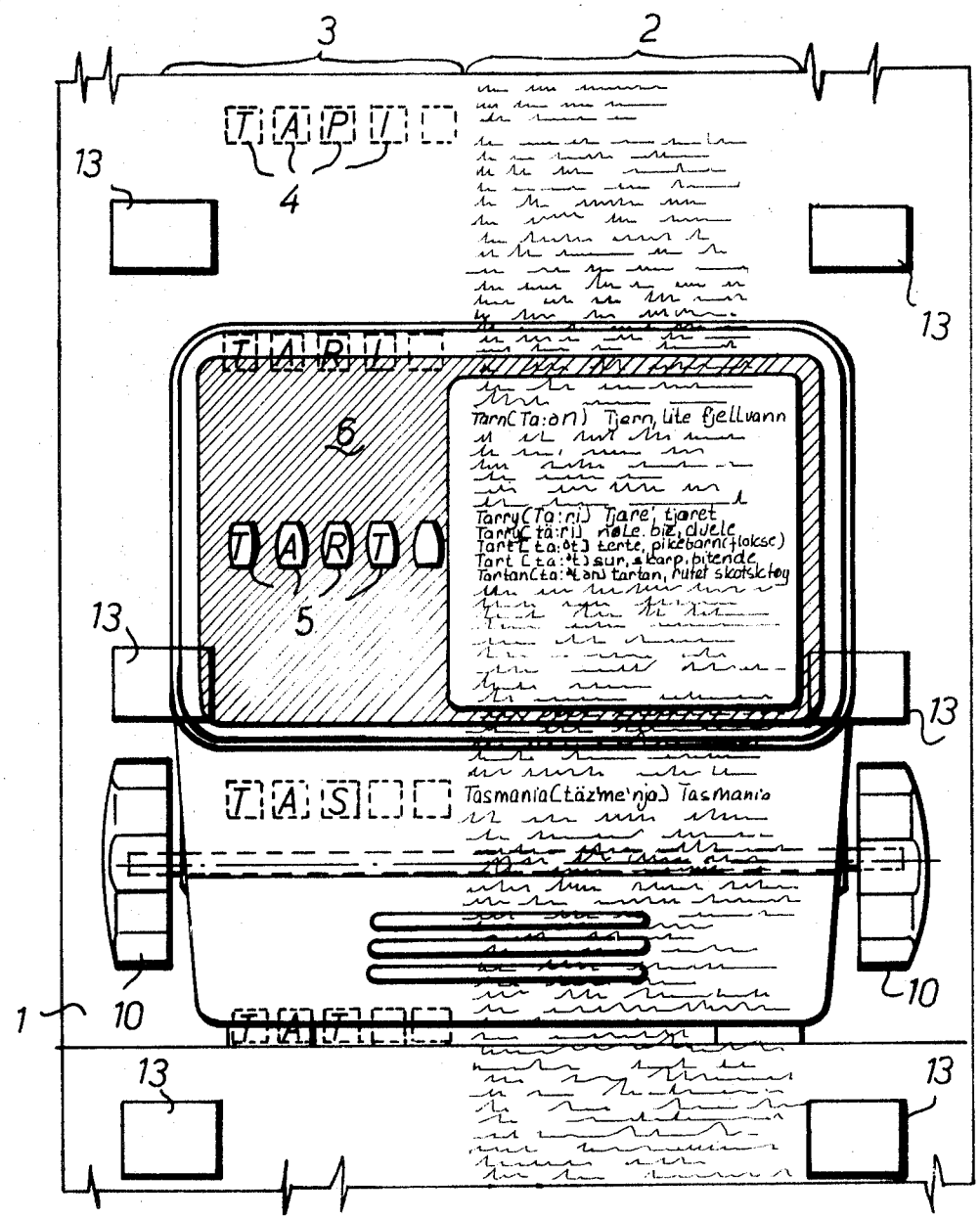
FIG. 2 is a diagrammatic front view showing a greatly magnified section of a microfilm according to the invention shown diagrammatically in back of the mat screen of FIG. 1, the view illustrating the manner in which the microfilm is projected onto the screen and its cooperation therewith.

The film 1 is, as shown greatly magnified in FIG. 2, divided lengthwise into a section 2 carrying the information on the film and a section 3 with symbols for identifying the information on the film. In the example shown, the information in section 2 is a dictionary and the cue index symbols such as letters and words, or identifications 4 in the section 3 are the first letters in the cue word which are extracted from the text of section 2 at regular intervals. The letters 4 come into view in openings 5 in the mat screen 6 when they are projected onto the screen in the projection apparatus 7 itself as shown in FIG. 1.

According to the diagrammatic showing in FIG. 1, the microfilm which is stored on reels 8 and 9 and manually or with the help of a motor can be run forwards or backwards. An operating button or knob 10 controls the motor both with regard to speed of rotation and direction of rotation by conventionally known means. The film 1 runs over standard-type guide rollers 11 for film, and over a sprocket 12 with teeth which fit into the perforations 13 (FIG. 2) in the film, in such a manner that the film cannot slide off the rollers 11. When the film is moved, it thus causes the sprocket 12 to rotate, and a gear wheel 14, shown in dot and dash outline and mounted on the shaft of the sprocket wheel 12 moves together with the sprocket 12. The gear wheel 14 drives, in turn, a gear wheel 15, shown by a full line circle, and connected to the axle of this there is an optical tilting device of known type which may be rotating mirror or a rotating prism 16.

In a similar manner FIG. 1 of the Bolsey patent shows a sprocket 18 which actuates two gear wheels shown as full line circles. At the center of the second circle a prism 14 is shown in a position to receive projected images from a film. FIG. 1 shows the prism in its association with a light source 15 and lens sets. The Baia patent shows a rotatable prism or shutter actuated by a film A moving over a sprocket which drives the shutter through gearing, such as that shown in FIGS. 7 and 8.

Devices such as the rotating prism together with its function are disclosed in the above-mentioned patents. In accordance with the present invention and apparatus shown in FIG. 1, a picture or image which is projected through this optical arrangement, and which moves at an even speed and continuously can be held stationary on the mat screen 6 by, for example, the prism 16, which refracts the light from the picture and which rotates in the correct direction, simultaneously and synchronously with the movement of the film. The optical equipment comprises in the example shown in FIG. 1 two sets of lenses 17, a light source 18 and a mirror 19. The rotating prism 16 may cover the entire width of the film if this should be necessary, but the primary feature is that at least those parts of the film in which the index symbol letters 4 are recorded in the example shown, are kept stationary long enough to enable the reader to see the letters come and change in the openings 5. In FIG. 2 we see the letters T,A,R,T, in the openings 5 and if the reader is looking, for example, for the meaning of the English word "Tapis", he will run the film forward with the help of the operating knob 10 until the letters R and T in the windows 5 change to P and I. On stopping the film the required word will be found in the windows 5 of the mat screen 6. If the film is motor driven, it can be run through from the one reel 8 to the other reel 9, or vice versa in a very short time, and one may in this manner "skip through the pages" of very comprehensive works in a minimum of time.

The example shown serves merely to illustrate the invention and forms no limitation to the protection this patent gives, in that other designs which would fall within the scope of this invention may well be envisaged.

I claim:

1. In a system for projecting a microfilm carrying stored or recorded information and index symbols therefor, comprising a projector including a viewing screen having a mat viewing area, optical means for projecting images from the microfilm onto the viewing area of the screen, and means for passing the film through the projector relative to the optical means, said optical means including an optical compensating device rotatable in synchronism with the linear movement of the film, the improvement wherein the microfilm includes longitudinal side-by-side sections respectively provided with cue index symbols and oppositely arranged text of the recorded information identifiable by such symbols, the text of the recorded information extending continuously along its side section of the microfilm and the cue indexing symbols being located at spaced intervals along the symbol side of the film respectively opposite appropriate portions of the text, and wherein the disposition of the compensating device relative to the sections of the microfilm is such that it will hold the images of the cue indexing symbols stationary by refraction on a predetermined area of the screen while images of the text on the microfilm are moving at high speed across the screen with uninterrupted movement of the film relative to the optical means until a desired cue index symbol is displayed on the symbol side of the screen and the film is stopped to permit reading of the text on the screen opposite the desired index symbol.

2. A system as claimed in claim 1, wherein the indexing symbols on the symbol side of the microfilm are significantly larger than the individual indicia on the text side of the microfilm representing the recorded information proper.

3. A system as claimed in claim 1, wherein the viewing screen is provided with a viewing window for viewing the images of the indexing symbols as they are projected by the optical compensating device of the projector.

4. A system as claimed in claim 3, wherein the viewing window for the symbol images comprises an opening in the mat viewing area of the screen.

5. A system as claimed in claim 1, wherein the indexing symbols are comprised of characters the images of which are displayed at a greater size than that of the displayed characters imparting said information.

6. A system as claimed in claim 1, wherein the indexing symbols comprise a series of letters spelling words or parts of words carried on the symbol side of the film and respectively identifying portions of the text on the opposite side of the film.